United States Patent [19]

Podszun et al.

[11] 4,369,296

[45] Jan. 18, 1983

[54] PROCESS FOR THE PRODUCTION OF METHYL METHACRYLATE HOMO- OR CO-POLYMERS

[75] Inventors: Wolfgang Podszun, Cologne; Carlhans Süling, Odenthal; Heinrich Alberts, Cologne, all of Fed. Rep. of Germany

[73] Assignee: Bayer Aktiengesellschaft, Leverkusen, Fed. Rep. of Germany

[21] Appl. No.: 243,877

[22] Filed: Mar. 16, 1981

[30] Foreign Application Priority Data

Mar. 18, 1980 [DE] Fed. Rep. of Germany ....... 3010373

[51] Int. Cl.$^3$ .................... C08F 2/00; C08F 120/18
[52] U.S. Cl. .................... 526/209; 524/367; 524/369; 524/378; 526/328.5; 526/329; 526/329.2; 526/329.3; 526/329.7
[58] Field of Search .............. 260/45.7 R; 526/209, 526/329, 329.2, 329.3, 328.5, 329.7; 524/367, 369, 378

[56] References Cited

U.S. PATENT DOCUMENTS

| | | | |
|---|---|---|---|
| 3,026,307 | 3/1962 | Gorham et al. | 526/329.7 |
| 3,110,702 | 11/1963 | Delacretaz | 526/329.7 |
| 3,272,786 | 9/1966 | Perry | 526/329.7 |
| 3,357,962 | 12/1967 | Hopff et al. | 526/329.7 |
| 3,359,249 | 12/1967 | Hopff et al. | 526/329.7 |
| 4,254,247 | 3/1981 | Boileau et al. | 526/209 |

*Primary Examiner*—Harry Wong, Jr.
*Attorney, Agent, or Firm*—Connolly and Hutz

[57] ABSTRACT

A process for the polymerization of methyl methacrylate or mixtures thereof with up to 25%, by weight, based on total monomer, of vinyl monomers copolymerizable therewith, wherein polymerization is carried out in the presence of from 0.01 to 10%, by weight, based on total monomer, of one or more enol ethers derived from aliphatic or cycloaliphatic aldehydes or ketones.

7 Claims, No Drawings

PROCESS FOR THE PRODUCTION OF METHYL METHACRYLATE HOMO- OR CO-POLYMERS

This invention relates to a process for the polymerisation of methyl methacrylate or mixtures thereof with other vinyl monomers in the presence of enol ethers.

Alkyl mercaptans are proven molecular weight regulators commonly used in the field in question. In addition to alkyl mercaptants, sulphur-free regulator systems are also frequently used. Examples of sulphur-free regulators may be found, for example, in Houben-Weyl Methoden der Organischen Chemie, Georg Thieme Verlag, Stuttgart, 1961, Vol. XIV/1, pages 327 et seq. Sulphur-free regulators generally have the advantage over mercaptan regulators of a less noxious odour and reduced oxidisability, but in general are also attended by the disadvantage of a considerably weaker transfer activity so that higher concentrations of regulator are required for obtaining comparable molecular weights. Examples of particular unsaturated molecular weight regulators include 1-methyl-1-cyclohexene (U.S. Pat. No. 3,265,677), terpinols (German Auslegeschrift No. 1,795,395) and α-methyl styrene dimers (German Patent No. 966,375) which are used in the polymerisation of styrene and acrylic acid derivatives.

It has now been found that sulphur-free enol ethers are comparable with alkyl mercaptans as molecular weight regulators for the polymerisation of methyl methacrylate without having the disadvantages thereof, such as odour or oxidisability. Unsaturated cycloaliphatic enol ethers are particularly suitable for use as molecular weight regulators.

The present invention relates to a process for the polymerisation of methyl methacrylate or mixtures thereof with up to 25%, by weight, based on total monomer, of vinyl monomers copolymerisable therewith, wherein polymersation is carried out in the presence of from 0.01 to 10%, by weight, based on total monomer, of one or more enol ethers derived from aliphatic or cycloaliphatic aldehydes or ketones.

It is preferred to use from 0.05 to 1%, by weight, of enol ether, based on total monomer.

Suitable copolymerisable vinyl monomers are, for example, $C_2$-$C_{20}$ alkyl esters, preferably $C_2$-$C_{15}$ alkyl esters of methacrylic acid, $C_1$-$C_{20}$ alkyl esters, preferably $C_1$-$C_8$ alkyl esters of acrylic acid, styrene, $C_1$-$C_4$ alkyl-substituted styrenes, such as α-methyl styrene, acrylonitrile, methacrylonitrile or mixtures thereof.

The present invention also relates to the products obtained by the process according to the present invention.

Major advantages of the enol ethers used in accordance with the present invention over the alkyl mercaptans normally used in the field in question include lack of odour, the absence of oxidisability and an additional stabilishing effect upon the polymers in the event of thermal stressing for a comparable regulating effect. This stabilising effect may be enhanced by using additional synergistic antioxidant/stabiliser combinations, for example during the thermoplastic processing of the polymers.

The polymers produced by the process according to the present invention preferably have intrinsic viscosities [η] of from 0.8 to 2.8 dl/g, as measured in chloroform at 25° C. Generally the polymers have statistical structure and molecular weights from 100,000 to 1,000,000.

Enol ethers derived, on the one hand, from aliphatic or cycloaliphatic aldehydes or ketones and, on the other hand, from alkyl, cycloalkyl or aralkyl alcohols are suitable for the process according to the present invention. The cycloaliphatic aldehydes or ketones may be substituted in the ring or bridged and/or may contain a double bond, Examples are butyraldehyde, valeraldehyde, cyclohexyaldehyde, cyclohexenyl aldehyde, bicyclo-[2.2.1]hexenylaldehyde and cyclohexanone. It is preferred to use the cycloaliphatic aldehydes or ketones which may optionally be substituted in the ring by one or two $C_1$-$C_5$ alkyl groups, particularly methyl groups.

Suitable alcohols are $C_1$-$C_{20}$ alkanols which may optionally be branched or unsaturated, $C_5$-$C_{10}$ cycloalkanols and $C_7$-$C_{20}$ aralkyl alcohols of which the cycloalkyl or aryl group may optionally be substituted by $C_1$ to $C_4$ alkyl radicals. Examples are methanol, ethanol, n-propanol, isobutanol, 2-ethyl hexanol, cyclohexanol and benzyl alcohol.

Examples of enol ethers which may be used in the process according to the present invention are shown in Tables 1 to 5 below.

TABLE 1

Enol ether (1)

| R | Boiling point Torr/°C. |
|---|---|
| —CH$_2$—C$_6$H$_5$ | 0.1/93 |
| —CH$_3$ | 25/89 |
| —C$_2$H$_5$ | 16/72 |
| -n-C$_3$H$_7$ | 11/86 |
| -n-C$_4$H$_9$ | 17/106–108 |
| -iso-C$_4$H$_9$ | 17/99–100 |
| -n-C$_5$H$_{11}$ | 14/116 |
| -n-C$_8$H$_{17}$ | 0.08/110 |
| -3,4,5-trimethyl hexyl | 0.15/93 |
| -n-C$_{10}$—H$_{21}$ | 0.12/111–112 |
| -n-C$_{12}$H$_{25}$ | 0.08/113 |
| —C$_{18}$H$_{37}$ | 0.05/195–200 |
| —C$_6$H$_{11}$ | 0.1/82 |

TABLE 2

Enol ether (2)

| R$_1$ | R$_2$ | R | Boiling point Torr/°C. |
|---|---|---|---|
| CH$_3$ | H | —CH$_2$—C$_6$H$_5$ | 0.08/99 |
| CH$_3$ | H | -n-C$_4$H$_9$ | |
| CH$_3$ | H | -n-C$_6$H$_{13}$ | 29/130 |
| CH$_3$ | H | -2-ethyl hexyl | 0.07/84–85 |
| CH$_3$ | H | -n-C$_8$H$_{17}$ | 0.08/103 |
| CH$_3$ | H | -n-C$_9$H$_{19}$ | 0.06/90 |
| CH$_3$ | H | -n-C$_{10}$H$_{21}$ | 0.06/106–108 |

TABLE 2-continued

Enol ether (2)

$$\text{R}_1\text{-cyclohexyl with } R_2, =C(H)-O-R$$

| $R_1$ | $R_2$ | R | Boiling point Torr/°C |
|---|---|---|---|
| CH$_3$ | H | -n-C$_{12}$H$_{25}$ | 0.07/136 |
| CH$_3$ | H | -n-C$_{14}$H$_{29}$ | 0.07/165 |
| CH$_3$ | H | -n-C$_{16}$H$_{33}$ | 0.075/173–175 |
| CH$_3$ | H | —⟨H⟩ (cyclohexyl) | 0.08/79 |
| CH$_3$ | CH$_3$ | —CH$_2$—⟨phenyl⟩ | 0.07/107 |
| CH$_3$ | CH$_3$ | —C$_6$H$_{13}$ | 0.08/99 |

TABLE 3

Enol ether (3) — norbornenyl =CH—O—R

| R | Boiling point Torr/°C |
|---|---|
| —CH$_2$—⟨phenyl⟩ | 0.055/106 |
| 2-ethyl hexyl | 0.12/89–90 |
| -n-C$_{10}$H$_{21}$ | 0.05/114–116 |
| 3,4,5-trimethyl hexyl | 0.14/100 |

TABLE 4

(4) cyclohexyl=CH—O—R

| R | Boiling point Torr/°C |
|---|---|
| —CH$_2$—⟨phenyl⟩ | 0.07/83 |
| 2-ethyl hexyl | 0.075/72–73 |

TABLE 5

Enol ether (5) — cyclohexenyl—O—R

| R | Boiling point Torr/°C |
|---|---|
| -2-ethyl hexyl | 0.66/68–69 |
| -3,4,5-trimethyl hexyl | 0.22/82–83 |
| CH$_2$—⟨phenyl⟩ | 0.11/92–94 |

It is preferred to use ethers corresponding to the following general formula (6):

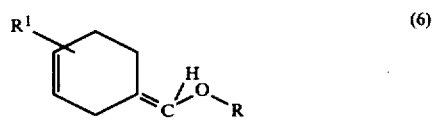

(6)

wherein R$_1$ represents H or CH$_3$; and R represents C$_1$–C$_{10}$ alkyl, C$_5$–C$_{10}$ cycloalkyl or benzyl.

The production of enol ethers is described in detail in the literature, for example in Houben-Weyl, Methoden der Organischen Chemie, Vol. VI/3, page 90, Georg Thieme Verlag, Stuttgart, 1965. A good method is based on a synthesis from the aldehyde via the acetal as an intermediate stage, by which it is possible to obtain various enol ethers.

The enol ethers used as molecular weight regulators are employed in quantities of from 0.01 to 10%, by weight, preferably from 0.05 to 1%, by weight, based on the total monomer. The enol ethers may be added at any stage during the polymerisation reaction, although the enol ether preferably used as a regulator is added at the beginning of polymerisation.

The polymerisation process according to the present invention may be carried out in homogeneous or heterogeneous phase, i.e. in organic solution or suspension, by emulsion or suspension polymerisation in the aqueous phase or by bulk polymerisation, for example in the melt.

Depending on the initiator system selected, polymerisation in homogeneous or heterogeneous phase is generally carried out at temperatures of from −10 to +300° C., preferably from 60° to 200° C. The polymerisation reaction may be carried out under pressures of from 50 to 760 Torr, preferably from 400 to 760 Torr, or under pressures of from 1 to 100 bars, preferably from 1 to 25 bars.

Polymerisation may be carried out either continuously or in batches.

The polymerisation reaction may be carried out in the presence of radical initiators, such as UV light or other high-energy radiation, optionally in combination with sensitisers or radical formers, such as peroxides. The polymerisation reaction is preferably initiated by radical-forming compounds.

The inititators are generally used in quantities of from 0.01 to 3%, by weight, preferably from 0.1 to 1.5%, by weight based on total monomer.

Suitable polymerisation initiators are, for example, per-compounds or radical-yielding azo compounds, such as aliphatic azodicarboxylic acid derivatives, such as azo-bis-isobutyronitrile or azodicarboxylic acid esters; peroxides, such as lauroyl peroxide, succinyl peroxide, dibenzoyl peroxide; p-chlorobenzoyl peroxide or 2,4-dichlorobenzoyl peroxide, ketone peroxides, such as methyl ethyl ketone peroxide, methyl isobutyl ketone peroxide, cyclohexanone peroxide or acetyl acetone peroxide; alkyl esters of per-acids, such as tert.-butyl perpivalate, tert.-butyl peroctoate, tert.-butyl perbenzoate, tert.-butyl perisononanoate, mono-tert.-butyl permaleate or tert.-butyl peracetate; percarbonates, such as dicyclohexyl or diisopropyl percarbonate; dialkyl peroxides, such as di-tert.-butyl peroxide or dicumyl peroxide; hydroperoxides, such as tert.-butyl or cumene hydroperoxide; isophthalic monoperacid or acetyl cyclohexane sulphonyl peroxide.

It is also possible to use peroxides and radical initiators prepared in situ. Suitable reactions are, for example, the reaction of phosgene, chloroformic acid esters, acid halides, monoisocyanates or diisocyanates with hydrogen peroxide or hydroperoxides.

Hydrogen peroxide and the alkali metal or alkaline earth metal salts of peracids or peroxacids are used as water-soluble initiators. It is preferred to use ammonium and potassium peroxydisulphate. Water-soluble initiators are used where polymerisation is carried out in heterogeneous or homogeneous aqueous phase.

The polymerisation reaction may also be initiated by redox systems. In this case, it is possible to use combinations of hydrogen peroxide and reducing agents, such as, ascorbic acid and heavy metal salts, such as iron or copper salts, in addition to combinations of potassium or ammonium peroxydisulphate with alkali metal pyrosulphide.

To obtain particular effects, the initiation system may be varied to a considerable extent. In this connection, reference is made to the initiators and redox systems described in Houben-Weyl, Methoden der Organischen Chemie, 1961, Vol. XIV/1.

Where the process according to the present invention is carried out in aqueous suspension, dispersants have to be used to obtain satisfactory bead polymers. Examples of suitable dispersants are polyvinyl alcohol, partially hydrolysed polyvinyl acetates, polyvinyl pyrrolidone, cellulose or starch derivatives, such as methyl, ethyl or ethyl hydroxy celluloses. Sythetic dispersants (copolymers of hydrophilic and hydrophobic monomers) are, for example, styrene/acrylic acid, styrene/maleic acid anhydride, ethylene/acrylic acid, ethylene/maleic acid anhydride, acrylic acid ester/acrylic acid, (meth)acrylic acid derivative/(meth)acrylic acid copolymers, polyethylene oxides or ethylene/propylene oxide copolymers, polyesters having OH-numbers of from 10 to 250.

It is also possible to use finely divided water-insoluble inorganic substances as dispersants. Examples include carbonates, phosphates, sulphates and silicates of the alkaline earth metals, also aluminium oxide, aluminium hydroxide, bentonite and talcum.

The ratio, by weight, of aqueous phase to monomer phase should be from 8:1 to 1:1, preferably from 3:1 to 1:1.

One particular advantage of suspension polymerisation is that the bead polymer obtained is simple to work-up and easy to dry.

Where the process according to the present invention is carried out in one of the conventional organic solvents, the polymerisation reaction is started in a homogeneous phase of the monomers, the initiator system selected, the solvent and the enol ether. If the solvent is not a solvent for the polymer formed, polymerisation is completed in the form of precipitation or suspension polymerisation. Suitable organic solvents are saturated aliphatic or aromatic hydrocarbons, substitued aromatic hydrocarbons, such as toluene or chlorobenzene, halogenated aliphatic hydrocarbons, such as methylene chloride, carbon tetrachloride, trichloroethylene, tetrachloroethylene or trichlorofluormethane, or other aliphatic fluorochlorinated hydrocarbons or fluorinated hydrocarbons, low-boiling alcohols, such as methanol, ethanol, propanol, isopropanol, isomeric butanols, preferably tert.-butanol, also dimethyl formamide or dimethyl acetamide.

The process according to the present invention may also be carried out by emulsion polymerisation.

Suitable emulsifiers are the alkali metal salts of modified resinic acids, such as the sodium salt of hydrogenated abietic acid, and also alkyl sulphates and sulphonates containing from 12 to 24 carbon atoms in the alkyl radical. It is preferred to use biodegradable emulsifiers. The emulsifiers are generally used in an amount of from 0.05 to 20%, by weight, preferably from 0.5 to 3%, by weight, based on the aqueous phase. These emulsifiers may, of course, be combined as required with the dispersants mentioned above.

When it is desired to isolate the polymer, this may be done by precipitation from the emulsion using known methods or, for example, by spray drying.

In addition, copolymerisation may be carried out in the presence or absence of solvents in polymerisation apparatus, such as screw extruders, kneaders or specialised stirrer units. The solvents and residual monomers are evaporated off from the polymerisation mixtures in evaporation screws, thin-layer evaporators, tubular coil evaporators or spray dryers. In addition, conventional additives, such as chain transfer agents for telomerisation, other molecular weight regulators where they are required in addition to the enol ethers, stabilisers, lubricants, antistatic agents and antioxidants may be added to the polymerisation mixtures.

The polymers obtained by the process according to the present invention may be used, inter alia, for the production of injection mouldings. The polymers are particularly suitable for use in the dental field, for example for the production of artificial teeth by the powder-liquid process.

EXAMPLES 1 to 12 (Suspension Polymerisations)

General Procedure:

Reaction vessel:

3-liter face-ground beaker equipped with a paddle stirrer, reflux condenser, internal thermometer, gas inlet and gas outlet.

Solution 1 aqueous phase
1000 ml of distilled water
10 g of polyvinyl pyrrolidone

Solution 2

300 g of monomer
3 g of benzoyl peroxide (75% purity)
0.03–3 g of enol ether as regulator Solution 1 and solution 2 are introduced into the reaction vessel in the absence of air and stirred for 30 minutes at 600 r.p.m. The suspension formed is heated, with continuous stirring, to 76° C. and, when the reaction becomes exothermic, is cooled so intensively that the internal temperature remains at from 76 to 80° C. After the reaction has abated, the reaction mixture is stirred for 4 hours at 80° C. The bead polymer formed is separated by filtration, washed repeatedly with distilled water and dried at 80° C. The intrinsic viscosities [$\eta$] are measured in chloroform at 25° C.

| Screen analysis (Example 4) | | |
|---|---|---|
| >200µ | 0.50% | Mean particle size: 88µ |
| 100–200µ | 34.04% | |
| 80–100µ | 25.10% | |
| 63–80µ | 15.06% | |
| 40–63µ | 14.26% | |

-continued

| Screen analysis (Example 4) | |
|---|---|
| 0–40μ | 11.02% |

TABLE 6

| Example No. | Monomer | Regulator | Quantity of regulator [%] | [η]$^a$ |
|---|---|---|---|---|
| 1 | methyl methacrylate (MMA) | — | — | 2.88 |
| 2 | MMA | 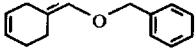 | 0.01 | 2.35 |
| 3 | MMA | " | 0.05 | 1.94 |
| 4 | MMA | " | 0.1 | 1.80 |
| 5 | MMA | " | 0.2 | 1.38 |
| 6 | MMA | " | 0.5 | 0.89 |
| 7 | MMA | 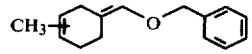 | 0.05 | 2.10 |
| 8 | MMA | " | 0.10 | 1.97 |
| 9 | MMA | " | 0.50 | 1.05 |
| 10 | MMA | 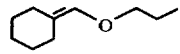 | 0.10 | 1.57 |
| 11 | 75% MMA 25% ethyl acrylate | — | — | 2.4 |
| 12 | 75% MMA 25% ethyl acrylate | 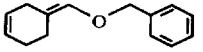 | 0.1 | 1.4 |

$^a$intrinsic viscosity of the polymer

EXAMPLES 13 to 19 (Emulsion Polymerisation)

General Procedure:

Reaction vessel;

3-liter face-ground beaker equipped with a paddle stirrer, reflux condenser, internal thermometer, gas inlet and gas outlet pipe.

Solution 1 aqueous phase
900 ml of distilled water
15 g of sodium dodecyl sulphonate
0.6 g of potassium peroxy disulphate Solution 2

300 g of methyl methacrylate
0.03–3 g of enol ether as regulator

Solution 1 and solution 2 are introduced into the reaction vessel in the absence of air and stirred for 10 minutes at 500 r.p.m. The reaction mixture is then heated, with continued stirring, to 80° C. The reaction begins immediately with formation of a latex and is virtually over when, after about 10 minutes, there is no further reflux in the condenser of the azeotropic of monomeric methyl methacrylate and water. The reaction mixture is then stirred for 2 hours at 90° C. A latex of polymethyl methacrylate is obtained in a yield of almost 100%. The polymethacrylate is precipitated using magnesium sulphate, filtered, washed with distilled water and dried at 80° C. The intrinsic viscosities [η] are measured in chloroform at 25° C.

TABLE 7

| Example No. | Regulator | Quantity of regulator [%] | [η] |
|---|---|---|---|
| 13 | — | — | 4.45 |
| 14 | 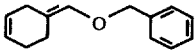 | 0.05 | 3.25 |
| 15 | " | 0.1 | 2.70 |
| 16 | " | 0.2 | 1.90 |
| 17 | " | 0.5 | 1.12 |
| 18 | 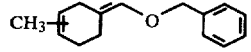 | 0.5 | 1.27 |
| 19 | 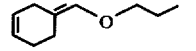 | 0.5 | 0.80 |

We claim:

1. A process for the polymerisation of methyl methacrylate or mixtures thereof with up to 25%, by weight, based on total monomer, of vinyl monomers copolymerisable therewith, wherein polymerisation is carried out in the presence of from 0.01 to 10%, by weight, based on total monomer, of at least one enol ether derived from an aliphatic or cycloaliphatic aldehyde or ketone.

2. A process as claimed in claim 1, wherein from 0.05 to 1%, by weight, based on total monomer, of said enol ether is used.

3. A process as claimed in claim 1 or 2, wherein said enol ether is selected from the group consisting of

(1)

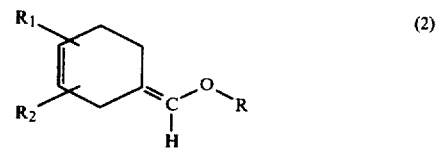

(2)

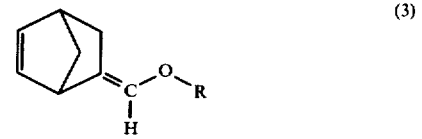

(3)

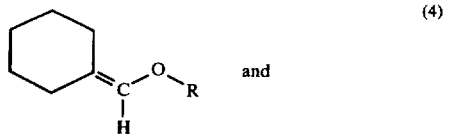 and (4)

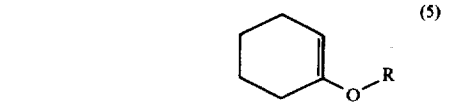

(5)

wherein $R_1$ and $R_2$, which may be the same or different, represent hydrogen or a $C_1-C_5$ alkyl radical; and R represents a $C_1-C_{20}$ alkyl, $C_5-C_{10}$ cycloalkyl or $C_7-C_{20}$ aralkyl radical.

4. A process as claimed in claim 1 or 2, wherein said enol ether is of the formula

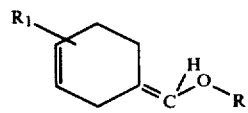
(6)

wherein $R_1$ represents H or $CH_3$; and R represents $C_1-C_{10}$ alkyl, $C_5-C_{10}$ cycloalkyl or benzyl.

5. A process as claimed in claim 1 or 2, wherein $C_2-C_{20}$ alkyl esters of methacrylic acid, $C_1-C_{20}$ alkyl esters of acrylic acid, styrene, $C_1-C_4$ alkyl substituted styrenes, acrylonitrile, methacrylonitrile or mixtures thereof are used as the copolymerisable vinyl monomers.

6. A process as claimed in claim 5, wherein $C_2-C_{15}$ alkyl esters of methacrylic acid, $C_1-C_8$ alkyl esters of acrylic acid or mixtures thereof are used as the vinyl monomers.

7. A process as claimed in claim 1 or 2, wherein polymerisation is carried out in emulsion or suspension.

* * * * *